(12) United States Patent
Kim

(10) Patent No.: US 6,665,426 B1
(45) Date of Patent: Dec. 16, 2003

(54) METHOD OF BIOMETRIC IDENTIFICATION OF AN INDIVIDUAL AND ASSOCIATED APPARATUS

(75) Inventor: Min Kim, Morgantown, WV (US)

(73) Assignee: West Virginia University Research Corporation, Morgantown, WV (US)

( * ) Notice: Subject to any disclaimer, the term of this patent is extended or adjusted under 35 U.S.C. 154(b) by 0 days.

(21) Appl. No.: 10/059,894

(22) Filed: Jan. 29, 2002

(51) Int. Cl.[7] .............................................. G06K 9/00
(52) U.S. Cl. ..................................................... 382/117
(58) Field of Search ........................ 382/100, 116–118, 382/128, 190, 218, 312, 321; 351/206, 211, 221, 210; 356/456; 396/18

(56) References Cited

U.S. PATENT DOCUMENTS

| | | | | |
|---|---|---|---|---|
| 4,109,237 A | * | 8/1978 | Hill ............................. | 382/117 |
| 4,641,349 A | * | 2/1987 | Flom et al. .................. | 382/117 |
| 5,291,560 A | * | 3/1994 | Daugman .................... | 382/117 |
| 5,572,596 A | * | 11/1996 | Wildes et al. ............... | 382/117 |
| 5,751,836 A | * | 5/1998 | Wildes et al. ............... | 382/117 |
| 6,198,532 B1 | * | 3/2001 | Cabib et al. ................. | 356/436 |
| 6,247,813 B1 | * | 6/2001 | Kim et al. ................... | 351/206 |
| 6,307,954 B1 | * | 10/2001 | Suzaki ........................ | 382/117 |
| 6,309,069 B1 | * | 10/2001 | Seal et al. ................... | 351/221 |
| 6,424,727 B1 | * | 7/2002 | Musgrave et al. .......... | 382/117 |
| 6,453,057 B1 | * | 9/2002 | Marshall et al. ............ | 382/117 |
| 6,526,160 B1 | * | 2/2003 | Ito .............................. | 382/117 |

OTHER PUBLICATIONS

Goldberg, Limbal Palisades of Vogt*, Tr. Am. Ophth. Soc. vol. LXXX (1982).
Young, et al., Allo–Limbal Transplantation in Patients with Limbal Stem Cell Deficiency; Br. J. Ophthalmol, (Dec., 1999); 83:1409.
Tsubota, Ocular Surface Management in Corneal Transplantation, a Review, Japanese Journal of Ophthalmology, 43, 502–508 (1999).
Koizumi, et al., Amniotic Membrane as a Substrate for Cultivating Limbal Corneal Epithelial Cells for Autologous Transplantation in Rabbits, Cornea 19(1); 65–71 (2000).
Dua, et al., Autologus Limbal Transplantatoin in Patients with Unilateral Corneal Stem Cell Deficiency, Br. J. Ophthalmol (Mar., 2000); 84:273–278.
Dua, et al., Limbal Stem Cells of the Corneal Epithelium, Survey of Opthalmology, vol. 44, No. 5, pp. 415–425 (Mar.–Apr. 2000).
Meller, et al. Amniotic Membrane Transplantation for Acute Chemical or Thermal Burns, American Academy of Ophthalmology, vol. 107, No. 5, pp. 980–989 (May, 2000).
Schwab, et al., Successful Transplantation of Bioengineered Tissue Replacements in Patients with Ocular Surface Disease, Cornea 19(4): 421–426 (2000).
Basti, et al., Current Status of Limbal Conjunctival Autograft, Current Opinion in Ophthalmology, 2000, 11(4): 224–32.
Tsai, et al., Reeconstruction of Damaged Corneas by Transplantation of Autologous Limbal Epithelial Cells, The New England Journal of Medicine, vol. 348, No. 2, pp. 86–93 (Jul. 2000).

* cited by examiner

Primary Examiner—Jose L. Couso
(74) Attorney, Agent, or Firm—Arnold B. Silverman; Eckert Seamans Cherin & Mellott, LLC

(57) ABSTRACT

A method of identifying an individual includes impinging radiation on perilimbal structures of the eye and employing acquired image information acquired from palisades and interpalisades for comparison with stored image information to determine if an identify match has been obtained. The palisades and interpalisades are not normally visible unless the eye and/or eyelids and forebrows are placed in a certain position thereby minimizing the risk of inadvertent delivery of this information. In a preferred approach a plurality of palisades and interpalisades are monitored in terms of at least one physical characteristic such as width, length, angular orientation, shape, branching pattern, curvature and spacing with the parameters being converted to binary data sequence form. Associated apparatus is provided.

30 Claims, 6 Drawing Sheets

METHOD OF BIOMETRIC IDENTIFICATION OF AN INDIVIDUAL AND ASSOCIATED APPARATUS

BACKGROUND OF THE INVENTION

1. Field of the Invention

The present invention relates to a method and associated apparatus for biometric of identification of an individual using information obtained from unique portions of the eye which vary from individual to individual and are not readily observable in the absence of the individual voluntarily positioning the eye and eyelids and forebrows in a particular location.

2. Description of the Prior Art

It has been known to attempt to provide high-security personal identification systems for a wide variety of purposes including, but not limited to, identification of individuals for law enforcement purposes, limiting access to secure facilities and information and verification of an individual's identity for other purposes when confirmation of identify is of great importance.

Among the known prior systems include the use of fingerprints, voice analysis, retinal scans and iris scans. Each of these approaches, while having some value, has inherent weaknesses. For example, fingerprint analysis is inherently insecure as copies of one's fingerprints may be left in many areas where they can be lifted from an object and used to create a security breach. Also, with the large number of databases containing fingerprints, such as for law enforcement purposes, there may be undesired access to such fingerprints.

Voice identification techniques can be circumvented with high-fidelity recording equipment and also can be obtained from a targeted individual without the person being aware that a security-threatening event has occurred. Also, voice analysis cannot be used to generate a number that uniquely identifies an individual.

Retinal scanning, while tending to be secure, is somewhat limited in value as it requires that there be a clear view of the retina. Any opacification of the media from the cornea to the vitreous may severely decrease the accuracy of this approach. Also, iris scans that employ the morphology of the crypts in the iris can be circumvented by merely taking a picture of the target without the target being aware that a security-compromising event has occurred.

In spite of the foregoing, there remains a great need for an improved method of personal identification which resists unknown efforts to duplicate the identification information, is reliable and accurate, and avoids some of the difficulties in the hereinbefore described approaches.

SUMMARY OF THE INVENTION

The present invention provides a method and associated apparatus, which permits accurate biometric identification of an individual.

In one embodiment of the method, electromagnetic radiation is employed to illuminate the eye of an individual such that at least one portion of the eye selected from the group consisting of the perilimbal structure inferior to the cornea and the perilimbal structure superior to the cornea, is subjected to the radiation. The reflected radiation being received by a detector converts the light into corresponding acquired image information which may be introduced into a processor that has stored information regarding the individuals, with a comparison being effected to determine if a match exists. Output may be provided in various manners to provide the result in respect of whether or not a match identifying the individual has occurred.

In the preferred practice of the method of this invention, the perilimbal structure has a plurality of individual palisades and a plurality of interposed individual interpalisades. By monitoring a plurality of the palisades or interpalisades or both, each palisade or interpalisade may be assigned a value, which in the aggregate provides a unique identification of the particular individual. The physical parameters which are employed may include the palisadal width, palisadal length, palisadal shape, palisadal branching patterns, palisadal angular orientation, and palisadal spacing. By comparing adjacent palisades and assigned binary values of one or zero to each palisade, a unique resultant number may emerge for purposes of comparison with the stored image information. In order to expose the inferior and superior perilimbal structures adjacent to cornea, the individual may be asked, respectively, to raise or lower the eye and with respect to the superior, in addition to causing the individual to look downward, the lids and forebrow are elevated.

A corresponding apparatus which may include a source of radiation, a detector to receive the reflected radiation and convert the same into an electrical signal containing corresponding acquired image information, may have its output introduced into a processing unit wherein a comparison of the acquired image information with the stored image information is effected. The output of the processor provides, to a human interface, an indication as to whether a match has occurred or not.

It is an object of the present invention to provide a highly specific personal, reliable biometric identification system for identifying individuals.

It is a further object of the present invention to provide such a system which relies on information readily obtainable from portions of the eye of the individual which are not normally visible when the individual is not making a conscious effort to expose these portions.

It is a further object of the present invention to provide such a system that employs palisades inferior to the cornea and superior to the cornea, with the interposed interpalisades also being employed.

It is a further object of the present invention to provide such a system, which may be employed with the benefit of computerized processing.

It is yet another object of the present invention to provide such a system which resists any effort to wrongfully appropriate the security indicia so as to interfere with the efficient functioning of the system.

It is a further object of the present invention to provide such a system which has such a wide range of variables that a computer generated number can uniquely identify an individual out of all other individuals to provide a distinct and reliable identification.

It is a further object of the present invention to provide such a system which avoids interference with accuracy as a result of normal degenerative changes in the eye that occur with age.

It is yet another object of the present invention to employ such a system which can be used in combination with other security techniques and systems in order to enhance reliability.

These and other objects of the invention will be fully understood from the following description of the invention with reference to the drawings appended hereto.

DESCRIPTION OF THE PREFERRED EMBODIMENTS

As employed herein the term "individual" refers to members of the animal kingdom including, but not limited to, humans.

As employed herein, the term "image information" means data corresponding to an image of the superior perilimbal structure or inferior perilimbal structure or both and expressly includes, but is not limited to, such information contained within radiation or electrical signals or converted into one or more binary numbers or binary data sequences.

Figure 1:
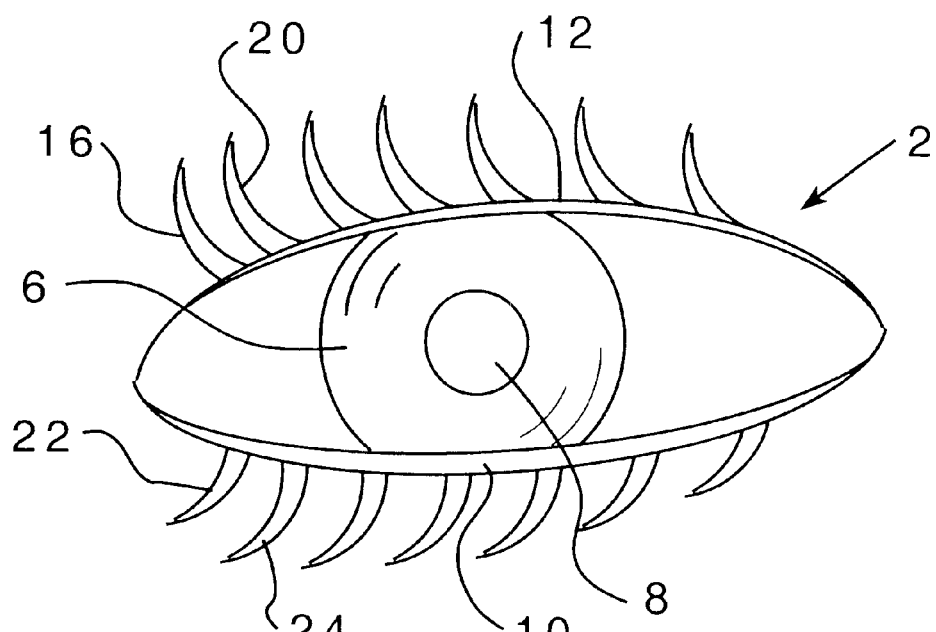
FIG. 1 is a schematic front elevational view of an eye showing how, under normal circumstances, with the palisades of Vogt and the interpalisadal spaces not being visible.

Referring now to FIG. 1 in greater detail, there is shown an eye 2, which includes a cornea 6 and a pupil 8 and has a lower lid 10 and upper lid 12 with a plurality of eyelashes, such as 16, 20, secured to the upper lid 12 and a plurality of eyelashes such as 22, 24, secured to the lower lid 10. This figure which shows the eye in the normal position, does not show the perilimbal structures 17, 19 as they are shielded respectively by the lower and upper lids 10, 12. One of the security features of the present invention is that the identifying elements of the eye would not be revealed inadvertently to others who might be tempted to photograph the same. As shown the cornea 6 has its lower and upper extremities covered, respectively, by the lower lid 10 and the upper lid 12.

Figure 2:
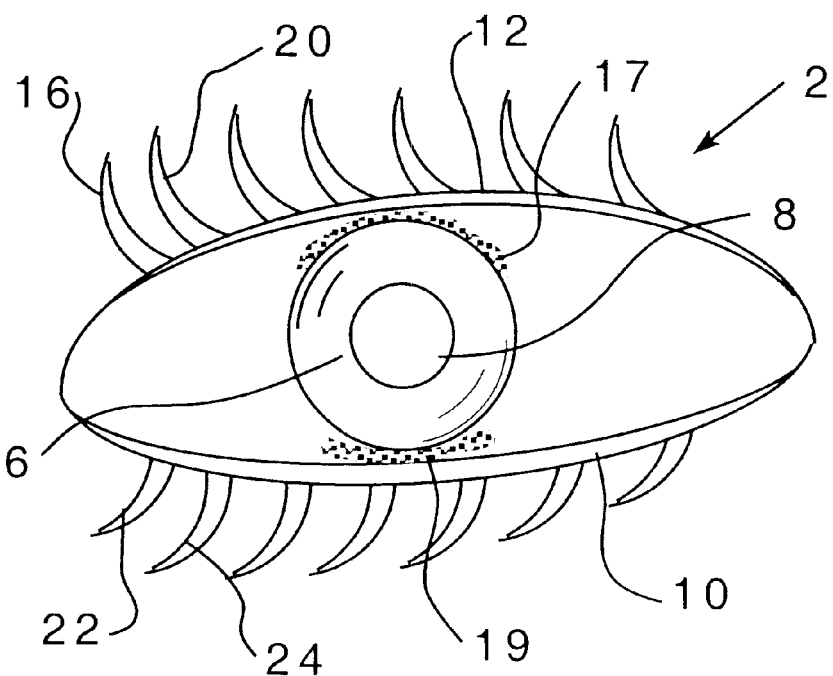
FIG. 2 is a front elevational view of the eye showing the normal locations of the palisades of Vogt and interpalisades.

Referring to FIG. 2, the cornea 6 is shown having the palisades of Vogt and interpalisades shown generally in the region superior to the cornea 6 and the region inferior to the cornea 6. The palisades of Vogt, as will be described herein in greater detail, are a series of generally radially oriented fibrovascular ridges concentrated along the upper and lower corneoscleral limbus where they aggregate into distinct crescentic zones. They lie peripheral to the terminal capillary loops of the limbus and central to Schlemm's canal. Between the connective tissue palisades are intervening radial zones of thickened conjunctival epithelium, which are the interpalisades or epithelial rete ridges. The present invention employs the morphology of the palisades of Vogt and interpalisades to identify an individual.

Referring still to FIGS. 1 and 2, in general, the upper eyelid 12 will extend over the cornea 6 about two millimeters, thereby completely covering the perilimbal structure superiorally. Similarly, the lower eyelid 10 extends all the way to the margin of the cornea 6 and completely covers the perilimbal structure inferiorally, as shown in FIG. 1. As a result, the only way to obtain images of the palisades and interpalisades is to have the individual look up in order to have the perilimbal structures inferior of the cornea exposed. The individual would look down while elevating the upper eyelid 12 and forebrow to expose the upper perilimbal structure. It, therefore, takes a fully conscious and unnatural movement to make these structures visible as shown in FIG. 2. This provides a substantial improvement over fingerprints, which can be lifted from any object that an individual has recently touched, or voice analysis which can be bypassed using standard recording equipment, or known iris scans which only require a high-fidelity photograph of the individual's eye. This is something that can be done at a distance without the subject being aware that a security-compromising incident has occurred.

Figure 3:
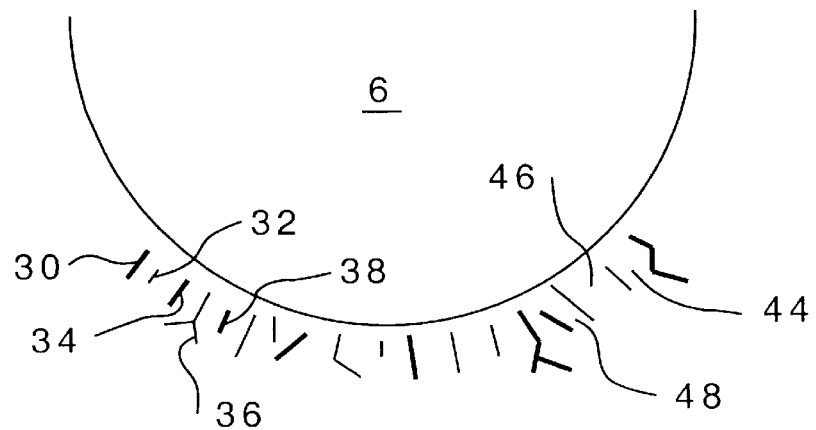
FIG. 3 is a schematic illustration showing the palisades of Vogt and interpalisades normally found in the perilimbal structure.

Referring to FIG. 3, there is shown the limbal palisades of Vogt, which are represented by black lines, such as 30, 32, 34, 36, 38, for example. In general, in each eye, the lower palisades of Vogt and the upper palisades of Vogt will each have approximately 40 palisades elements. It will be noted that as shown, the palisade elements 30, 32, 34, 36, 38 may vary in terms of physical characteristics, such as shape, width, length, branching patterns, spacing between adjacent palisades and angular orientation with respect to the corneal margin. These variations in the aggregate are unique to each individual. It will be appreciated that the upper palisades of Vogt will generally be positioned in the superior position and conceptually have the same number but different physical characteristics from the lower palisades. The interpalisades are disposed between adjacent palisades, such as spaces 44, 46, 48, for example, and provide another variable as these distances may differ between adjacent palisade elements both in the superior and inferior positions. The variations in physical properties of the inferior and superior palisades and interpalisades can be employed to generate a unique number based on their morphology. The number may then be introduced into a suitable processor such as a computer, which can compare the number with stored image information to determine whether there is a match between the individual and any stored number. This serves to permit rapid, reliable identification of an individual while greatly minimizing the risk of security breaches.

Creating a program to enable a computer to receive image information, convert the same into binary form, and effect appropriate binary comparisons with the stored binary information, will be known to those skilled in the art and, as a result, details regarding the software need not be provided herein. A preferred approach will be considered.

In general, one or more physical characteristics such as shape, width, length, curvature, branching pattern, space between palisades and palisade angular orientation with respect to the cornea margin may be selected for evaluation. If desired, more than one such physical characteristic may be used to achieve greater specificity.

Figure 4:
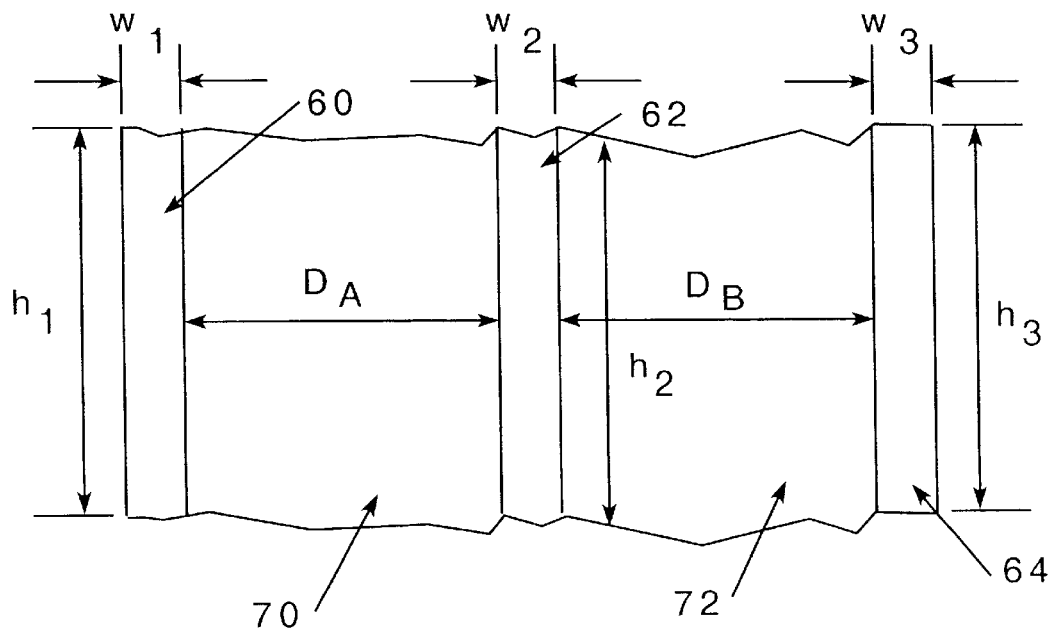
FIG. 4 shows a detailed schematic of the dimensions and interrelationship of several palisades and interpalisades.

Referring to FIG. 4, there is shown a first palisade 60, which has a height $h_1$ and a width $w_1$. A second palisade 62 has a height $h_2$ and a width $w_2$ and a third palisade 64 has a height $h_3$ and a width $w_3$. The interpalisade 70 is the distance $D_A$ between palisade 60 and palisade 62. Similarly, the interpalisade 72 is the distance $D_B$ between palisades 62 and 64. Assuming, for example, one were to employ these three palisades 60, 62, 64 and employ width and length as the physical parameters being monitored and further assuming that each of the palisades 60, 62, 64 have different widths and heights from the other, these may form a basis of comparison. For example, if it is determined that palisade 60 has a greater height than adjacent second palisade 62, palisade 60 would be assigned a number "1" in the binary system and if palisade 62 were shorter, it would be assigned the binary number "0". Sequentially, adjacent palisades within the inferior perilimbal structure and the superior perilimbal structure result in each element being assigned a binary number based on the value of an adjacent palisade. The inferior palisades may consist of a total number of 40 per cluster thereby creating a unique binary number as related to height. Subsequently, the same sequence may be followed in respect of width to create a second series of binary numbers all with respect to the inferior palisades. The procedure may be repeated with the superior palisadal elements and with other said physical characteristics including, but not limited to, the shape, branching pattern (see, for example, palisade 36 in FIG. 3), curvature, and angular orientation with respect to the cornea margin. The same comparison may be made in respect of the interpalisades. It will be appreciated that if one were to limit the physical parameters to height, width and interpalisadal spacing, one would have 120 bits of information. The number of individuals that could be provided with a unique number based solely upon the inferior palisade elements and superior palisade elements of one eye would, therefore, be $2^{240}$ or approximately $10^{72}$. As the total number of individuals on earth is on the order of $10^9$, there is enough variability in these structures to uniquely identify people, even allowing for substantial growth of the population.

Figure 5:
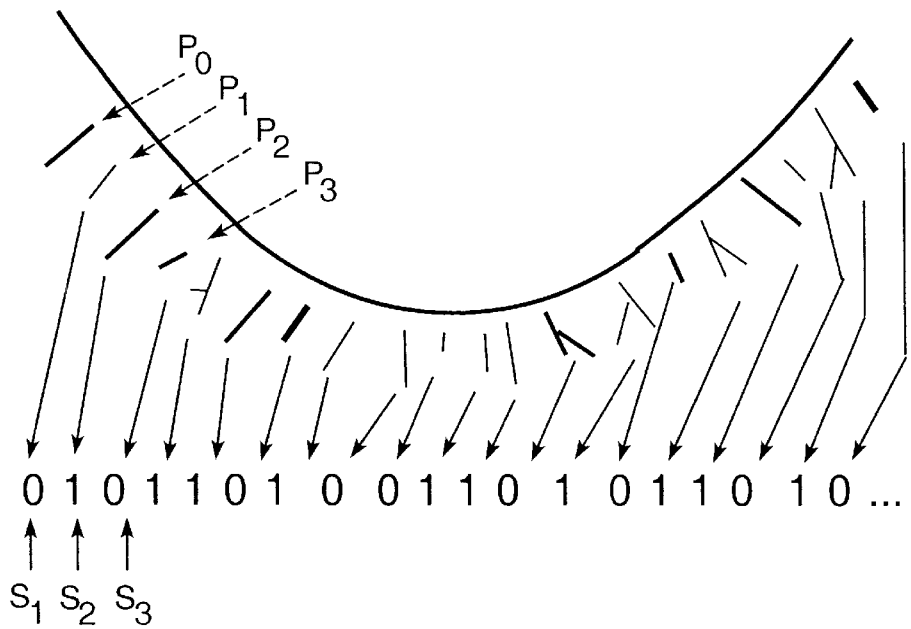
FIG. 5 is a detailed diagram showing the encoding of palisade length into a binary data sequence.

Referring to FIG. 5 in encoding of palisade length into a binary data sequence, a palisade is picked to be the starting point for the binary encoding process based on clarity of the image obtained. The length of that palisade is designated $P_0$. The length of each palisade that follows is said to be $P_1$, $P_2$, $P_3$, $P_4$, and so on. $S_n$ represents each element in the encoded data sequence. To compute each value $S_n$ in the encoded data sequence: $S_n=1$ if $P_n>P_{n-1}$; $S_n=0$ if $P_n<P_{n-1}$; $S_n=0$ if $P_n=P_{n-1}$.

In FIG. 5, the palisade to the far left is $P_0$. The length of the next palisade in the cluster is $P_1$. As $P_1<P_0$, the encoded length $S_1=0$. Proceed to the next palisade. The length of that palisade is $P_2$. As $P_2>P_1$, the encoded length $S_2=1$. In the next palisade $P_3$ is less than $P_2$ so the encoded length is 0. This process of length comparison and encoding is continued for the entire set of palisades visible in the cluster to obtain a binary representation of the length information extractable from that eye. This binary sequence representing the length acquired information will be compared with the stored length information. Length was chosen as the encoding variable because of the ease with which it was measurable and is easily visible on high magnification. Similar comparisons would be made with other acquired data related to other physical parameters and the related stored information.

EXAMPLE

In order to confirm the operability of the invention, tests were performed.

As illustrated in FIGS. 2 and 3, the limbal palisades of Vogt of 14 patients aged 30–55 years were photographed for analysis. Four sets of pictures were obtained from each patient, corresponding to the superior and inferior palisade clusters in each eye. The photos were enlarged and one cluster of palisades was chosen for analysis from each set of photos, based on the clarity of the images obtained.

To facilitate statistical analysis of the information present within the palisades, the length of each palisade was encoded into a binary sequence as previously described herein.

The limbal palisades of Vogt from 14 patients were photographed for analysis after obtaining informed consent.

To determine if the sequences were purely random or if they contained some ordered date, the "runs test" was performed. The runs test compares the total number of runs within the binary data sequence with that which would be expected if the binary sequence were totally random. The analysis gives a p-value, which is the probability that the sequence is not a purely random series of numbers. For example, in the sample sequence given in FIG. 5, there is initially a run of one zero, then a run of one one, then a run of one zero, then a run of two one's, and so on. The total number of runs is counted and compared to the statistically expected number and give a p-value for the null hypothesis that the sequence is totally random.

TABLE 3

RUNS TEST ANALYSIS

| Patient | Palisades | p-value |
| --- | --- | --- |
| 1 | 25 | 8 |
| 2 | 52 | 20 |
| 3 | 21 | 5 |
| 4 | 53 | 5 |
| 5 | 36 | 4 |
| 6 | 48 | 1 |
| 7 | 47 | 14 |
| 8 | 48 | 11 |
| 9 | 45 | 1 |
| 10 | 56 | 21 |
| 11 | 24 | 43 |
| 12 | 27 | 10 |
| 13 | 48 | 39 |
| 14 | 31 | 88 |

CUMULATIVE p-value: $3.8 \times 10^{-8}$

Table 3 displays the results obtained for each of the clusters analyzed from the 14 patients enrolled in the study. The average number of palisades of Vogt per cluster examined was 40. The average p-value for all the clusters examined was 0.20, suggesting that the distribution of length within the palisades was random. However, when each p-value was examined individually, it was found that 3 of 14 had p-values from 0 to 0.05, 4 of 14 had p-values from 0.05 to 0.10, 3 of 14 had p-values from 0.10 to 0.20, and 4 of 14 had p-values of greater than 0.20. Because 3 datastreams suggested that the palisade lengths contained some amount of nonrandom behavior (p-value <0.05), all the datastreams were concatenated and subjected to the same analysis. There were 564 palisades in the combined data sequence. The p-value for the runs test on this concatenated datastream was $3 \times 10^{-8}$, verifying that there was significant nonrandom behavior in the length of the palisades.

The length of the palisades is limited to a maximum and minimum. When the length of the palisade becomes very small, the subsequent palisade is much more likely to become larger than it is to become shorter. When the length of the palisade becomes very large, the subsequent palisade is much more likely to become shorter than it is to become longer. In other words, there is regression to the mean. Therefore, the greater the number of palisades examined, the greater the degree of order that will be revealed by the runs test. The runs test reveal a nonrandom distribution by detecting the two constraining factors; the maximum and minimum height of the palisades.

However, this does not mean that there is no random information that can be utilized to develop a highly secure personal identification system. It is rare for the palisade length to be at a maximum or minimum. Most of the time, the length is intermediate, and at this time, there is some randomness as to whether the next palisade will be longer or shorter. And when the palisade length is at the mean value, the next palisade can be shorter or longer with equal probability and it is in this position that there is the greatest amount of random information. In order to determine the amount of random information that is available per palisade, the concatenated sequence was subjected to serial correlation analysis. A correlation coefficient was calculated using the original concatenated data sequence as one dataset, and the same dataset displaced by one unit as the second value. The correlation coefficient was found to be −0.27.

The negative correlation agrees with our previous analysis. If the palisade is very long, then it is more likely that the next palisade will be shorter. If the palisade is very short, it is very likely that the next one will be longer. Intuitively, it seems that the serial correlation coefficient gives the degree of order within the data sequence.

Figure 6:
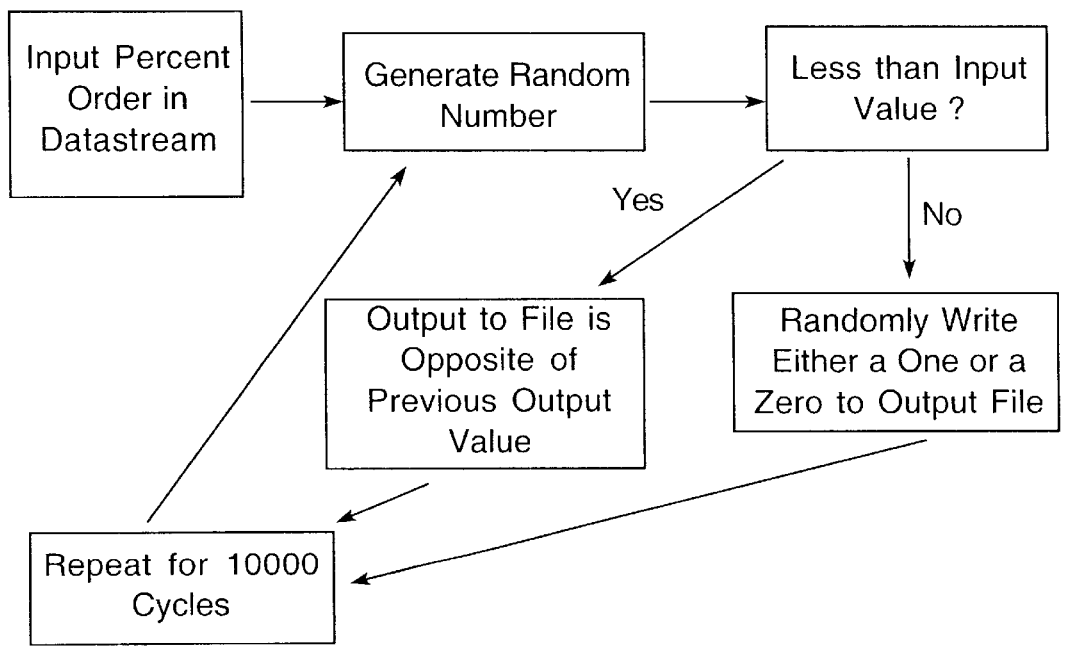
FIG. 6 is a flow diagram of a computer program to generate a model of limbal palisade length.
Figure 7:
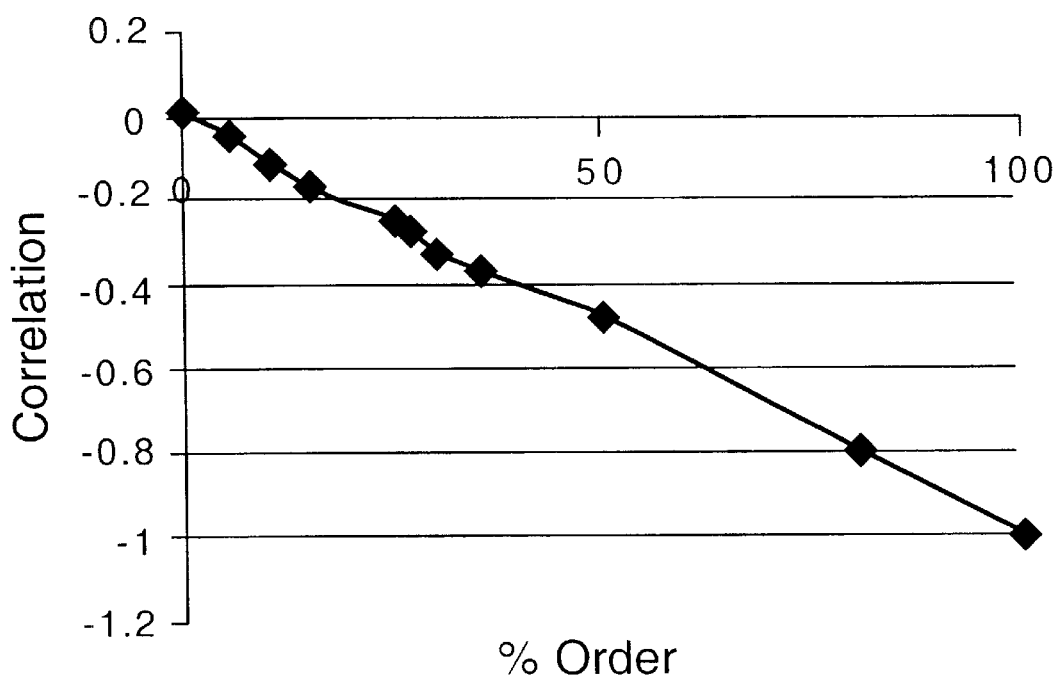
FIG. 7 is a plot of order versus correlation coefficient employing data generated by the computer program of FIG. 6.

To verify our intuition, a computer program was written that accepted as input a value between 0 and 100 which would correspond to the degree of order in the data sequence that the program would output (FIG. 6). For example, if a value of 50 was entered, half the data would be ordered and half would be random. If the input value is 20, then the computer program outputs a sequence consisting of 10000 data points, 20 percent of which are ordered and 80 percent of which are random. Various inputs were run through the program and subjected to serial correlation analysis with an offset of one. The data was plotted and revealed a straight line (FIG. 7) verifying our hypothesis that the correlation coefficient gives exactly the degree of order in a binary data sequence. FIG. 7 shows a plot of order versus correlation coefficient using data generated by computer program from FIG. 6. Various inputs between 0 and 100 were input into the program outlined in FIG. 7. A plot was generated of the input value, which corresponds to the percent order within the output data sequence, versus the serial correlation coefficient calculated from the output data stream. The graph revealed a 1:1 inverse relationship between the serial correlation coefficient and the degree of order within the binary data sequence. This confirmed our initial intuition that the serial correlation coefficient could be used for the determination of the amount of information present within the limbal palisades of Vogt. Therefore, each length measurement has 1 minus 0.27 or 0.73 bits of useful random information which can be successfully employed for identification purposes.

Figure 8:
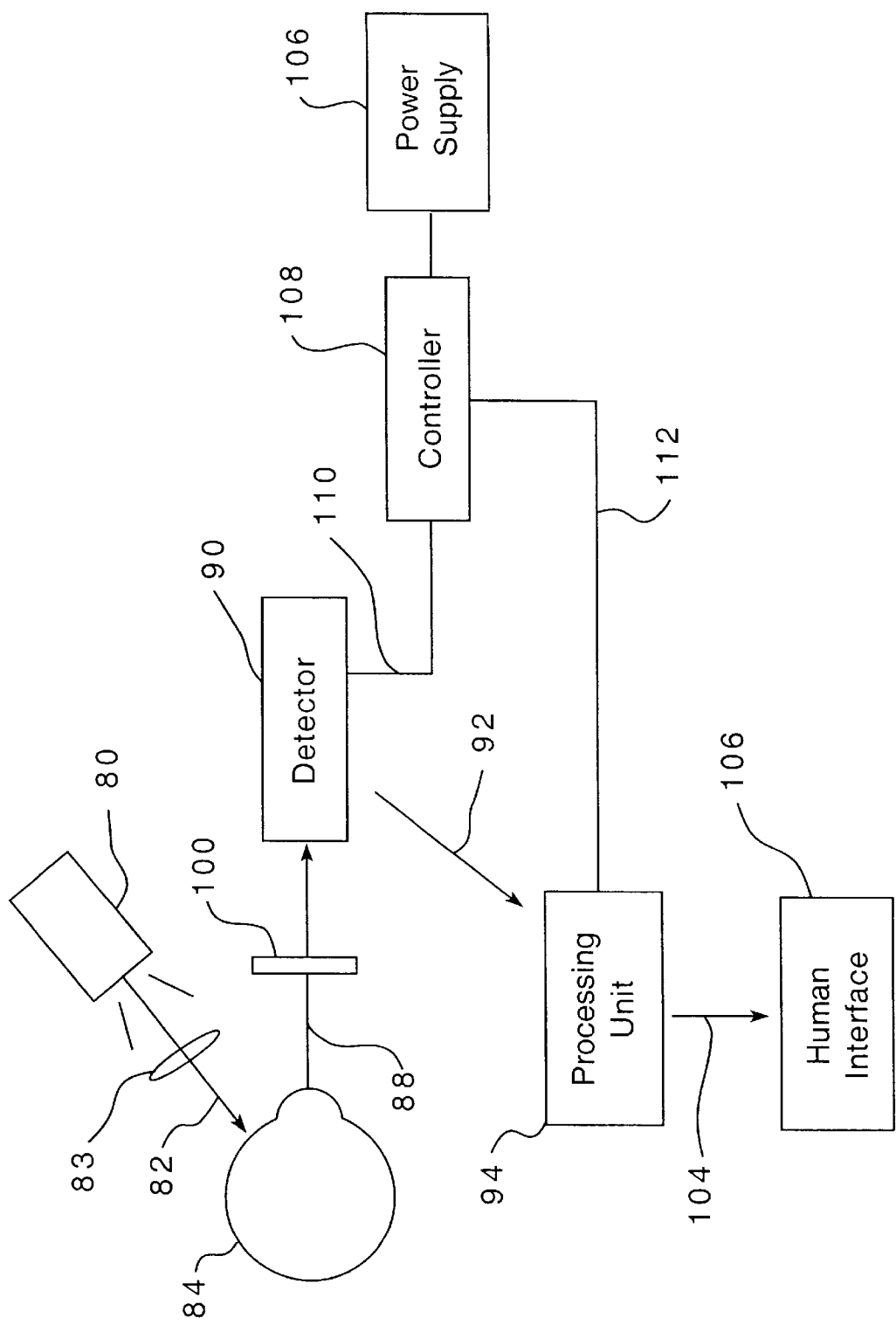
FIG. 8 is a schematic illustration of a form of apparatus usable in the present invention.

Referring now to FIG. 8, there is shown schematically apparatus usable in connection with the present invention. A source 80 of electromagnetic radiation, which may be provided by any suitable source, emits a beam of radiation 82, which impinges upon the eye 84 to acquire image information regarding the perilimbal structure inferior to the cornea or the perilimbal structure superior to the cornea and, preferably, both. If desired, a focussing lens 83 could be employed. The electromagnetic radiation need not be in the visible light structure and may be selected from a number of different wavelength bands. It may be either diffuse or, for example, a laser optimized to enhance the visibility of the perilimbal structures. Other suitable sources of radiation, such as infrared or ultraviolet could be employed, if desired. The reflected beam 88 emerging from the perilimbal structures is delivered to a detector 90, which converts the actual image information-containing radiation beam 88 into corresponding electrical signals 92, which are delivered to a processor 94, which may be a suitable computer. If desired, an appropriate filter 100 may be interposed between the eye 84 and the detector 90 so as to permit only certain light to pass therethrough. The detector 90 may be any sort of photodetector which will efficiently convert the reflected radiation into the corresponding electrical signal 92 containing the image information and may be, for example, a self-scanning array of photodiodes or a CCD camera, for example.

The processor 94 converts the image information into a binary data sequence in the manner described hereinbefore keyed to the position and one or more physical properties of the palisades and interpalisades. These binary numbers are then compared with stored image information so as to determine whether there has been an identity match or not. The result of the comparison is emitted at 104 to a human interface 106. As with any computer output, the output may be provided in many forms, depending upon what is desired. For example, a hard copy of the results could be printed, the results could appear on the computer monitor, the results could be stored for future use and combinations of the foregoing as well as other uses may be provided. It will be understood that the human interface can be so structured with the system as to receive a final answer or, in the alternative, for certain uses it may be desirable to have the human interface 106 receive information for further processing.

The system is energized by a suitable power supply 106 through controller 108 which is connected to detector 90 and processing unit 92, respectively, through leads 110, 112

Figure 9:
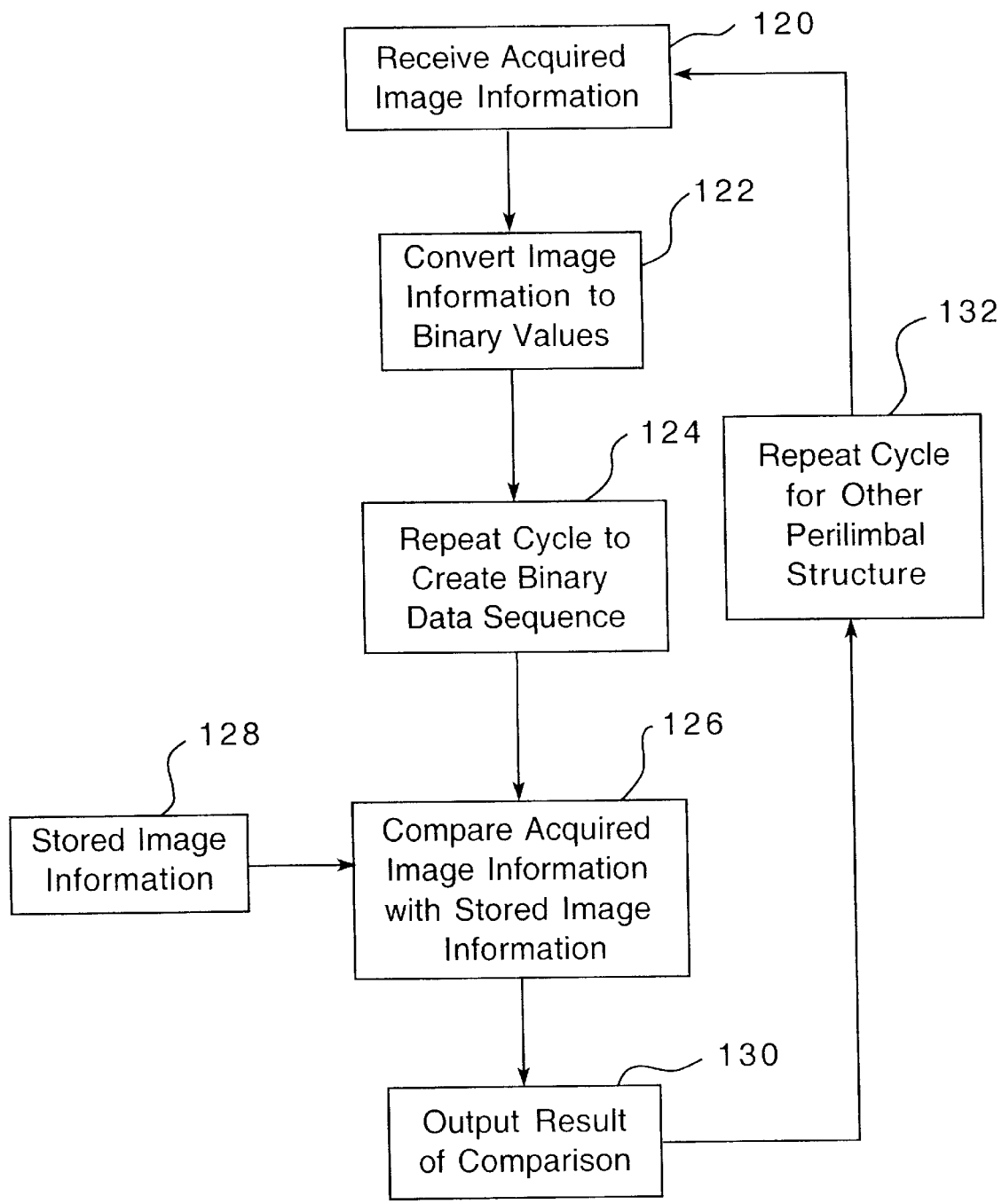
FIG. 9 is a flow diagram showing the processing of image information.

Referring now to FIG. 9, there is shown a portion of the processing which occurs within the processing unit 94 shown in FIG. 8. A beam of radiation, which is preferably pulsed, but may be continuous, will deliver acquired image information obtained from either the superior or inferior perilimbal structure to the processor at 120. The processor sequentially converts the image information into binary values 122, which involves sequential comparison with the next preceding palisade or interpalisade with the cycle being repeated until a binary data sequence 124 representative of a physical property of either the superior or inferior perilimbal structure is created. Subsequently, the acquired image information is compared 126 with stored image information in binary data sequence form 128 with the output 130 providing the determination as to a match indicating positive identification of the individual has been achieved or not. Subsequently, the cycle is repeated for the other perilimbal structure. In other words, if the first sequence involved obtaining acquired image information regarding the inferior perilimbal structure, the individual is subsequently instructed to move his or her eye and take any other action necessary, such as raising the upper eyelid and forebrow to expose the upper limbal structure, with the cycle being repeated. While this illustrated example of the process flow provides an output based on either the superior or inferior perilimbal structure, it will generally be preferred to repeat the cycle 132 and base the comparison on the information obtained from both perilimbal structures.

The method of the present invention may be employed on both eyes of the individual, sequentially or simultaneously.

It will be appreciated that the present invention provides a method and associated apparatus for securing, reliable image information employed in determination of the identity of an individual in a more reliable fashion than previously known systems. All of this is accomplished through access to a portion of the body which is not normally visible except when the individual intentionally exposes such portions, and also employs numbers which have such a huge variety that the uniqueness of a given identification is assured.

Whereas particular embodiments of the invention have been described herein for purposes of illustration, it will be evident to those skilled in the art that numerous variations of the details may be made without departing from the invention as defined in the appended claims.

I claim:

1. A method of biometric identification of an individual comprising impinging electromagnetic radiation on an eye of said individual on at least one portion of the eye selected from the group consisting of (a) the perilimbal structure inferior to the cornea and (b) the perilimbal structure superior to the cornea, converting said radiation as reflected from said portion into corresponding electrical signals containing acquired image information, and comparing said acquired image information with stored image information to make a determination as to whether a match exists.

2. The method of claim 1 including each said perilimbal structure having a plurality of individual palisades and a plurality of interposed individual interpalisades.

3. The method of claim 2 including obtaining said acquired image information from both said perilimbal structures inferior to the cornea and said perilimbal structures superior to the cornea.

4. The method of claim 3 including said acquired image information containing values corresponding to physical characteristics of a plurality of said palisades.

5. The method of claim 4 including said acquired image information containing values corresponding to physical characteristics of a plurality of said interpalisades.

6. The method of claim 5 effecting said comparison between said acquired image information and said stored information in a processor.

7. The method of claim 6 including providing said values in binary data sequence form.

8. The method of claim 7 including effecting said comparison in a computer.

9. The method of claim 8 including subsequent to said comparison providing output indicating whether a match existed between said acquired image data and said stored image data.

10. The method of claim 1 including impinging said radiation on portions of said eye which are exposed only after the eye or eyelids of the individual are in a specific position.

11. The method of claim 5 including selecting said physical characteristics from the group consisting of palisade width, palisade length, palisade shape, palisade branching pattern, palisade curvature, palisade angular orientation, palisade spacing and interpalisade width.

12. The method of claim 11 including assigning said binary values to said palisades by comparison between adjacent said palisades.

13. The method of claim 10 including having said individual look upwards to expose said perilimbal structures inferior to said cornea.

14. The method of claim 13 including having said individual look down and elevate the eyelid and forebrow to expose said perilimbal structures superior to said cornea.

15. The method of claim 1 including employing said method on both eyes of said individual.

16. The method of claim 1 including employing said method on one eye of said individual.

17. The method of claim 11 including effecting said comparison separately for each said physical characteristic employed.

18. The method of claim 14 including employing said method sequentially on both eyes of said individual.

19. The method of claim 7 including effecting comparisons between adjacent said palisades in obtaining said acquired image information.

20. Apparatus for biometric identification of an individual comprising a source of electromagnetic radiation for illuminating at least one portion of an eye of said individual selected from the group consisting of (a) the perilimbal structure inferior to the cornea and (b) the perilimbal structure superior to the cornea with each said perilimbal structure having a plurality of individual palisades and a plurality of individual interpalisades a detector for receiving said radiation as reflected from said eye with said radiation containing acquired image information from a plurality of said palisades and a plurality of said interpalisades and emitting a responsive electrical signal corresponding to acquired image information, and a processor having stored image information for comparison with said acquired image information as received from said detector and emitting the results of said comparison.

21. Apparatus for biometric identification of an individual comprising a source of electromagnetic radiation for illuminating an eye of said individual, a detector for receiving said radiation as reflected from said eye with said radiation containing acquired image information and emitting a responsive electrical signal corresponding to acquired image information, a processor having stored image information for comparison with said acquired image information as received from said detector and emitting the results of said comparison, and said detector receiving reflected radiation acquired image information containing information received from perilimbal structures of said eye selected from the group consisting of the perilimbal structure inferior to the cornea and the perilimbal structure superior to the cornea.

22. The apparatus of claim 21 including said processor being a computer.

23. The apparatus of claim 22 including said responsive electrical signal delivered to said computer containing acquired image information related to values of at least one physical characteristic of a plurality of said palisades.

24. The apparatus of claim 22 including said acquired image information signals containing values corresponding to physical characteristics of a plurality of said interpalisades.

25. The apparatus of claim 24 including said detector structured to receive said reflected magnetic energy containing said acquired image information only when said eye has said palisades or said interpalisades exposed.

26. The apparatus of claim 22 including said computer being structured to emit the results of said comparison as either identifying the individual due to a match between the acquired image information and the stored information or indicating that no such match occurred.

27. The apparatus of claim 26 including said computer being structured to effect comparisons between the stored image information and acquired image information based upon at least one physical characteristic selected from the group consisting of palisade width, palisade length, palisade shape, palisade branching pattern, palisade angular orientation and interpalisade spacing.

28. The apparatus of claim 27 including said detector structured to receive acquired image information from a plurality of said palisades and a plurality of said interpalisades.

29. The apparatus of claim 28 including said processor being structured to process binary data sequence values established for a plurality of palisades by comparison between adjacent said palisades.

30. The apparatus of claim 21 including said apparatus being structured to employ a single eye in effecting said identification.

* * * * *